United States Patent
Matsumoto (10) Patent No.: US 7,454,522 B2
(45) Date of Patent: Nov. 18, 2008

(54) CONNECTION MANAGEMENT APPARATUS FOR NETWORK DEVICES

(75) Inventor: Naoki Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 689 days.

(21) Appl. No.: 10/766,441

(22) Filed: Jan. 27, 2004

(65) Prior Publication Data

US 2004/0193708 A1  Sep. 30, 2004

(30) Foreign Application Priority Data

Mar. 13, 2003  (JP) .............................. 2003-068632

(51) Int. Cl.
*G06F 15/173* (2006.01)
(52) U.S. Cl. ................... 709/238; 709/223; 709/203
(58) Field of Classification Search ................. 709/223, 709/238, 203
See application file for complete search history.

(56) References Cited

U.S. PATENT DOCUMENTS

| | | | | |
|---|---|---|---|---|
| 6,639,901 | B1 * | 10/2003 | Katzri et al. ................. | 370/255 |
| 7,085,827 | B2 * | 8/2006 | Ishizaki et al. ............... | 709/223 |
| 2001/0049739 | A1 * | 12/2001 | Wakayama et al. .......... | 709/230 |
| 2003/0189936 | A1 * | 10/2003 | Terrell et al. ............ | 370/395.31 |

FOREIGN PATENT DOCUMENTS

| | | |
|---|---|---|
| JP | 2002-111712 | 4/2002 |
| JP | 2003-234752 | 8/2003 |

OTHER PUBLICATIONS

Japanese Office Action dated Nov. 20, 2007 for corresponding JP Patent Application No. 2003-068632.

* cited by examiner

*Primary Examiner*—Phuoc Nguyen
*Assistant Examiner*—Kishin G. Belani
(74) *Attorney, Agent, or Firm*—Katten Muchin Rosenman LLP (57) ABSTRACT

A connection management apparatus for network devices is disclosed. The connection management apparatus makes it possible to easily change connection paths of network devices for individual users, thereby decreasing the number of steps required to add and change a connection path. The connection management apparatus includes a lookup table and a tag replacement and transmission part. The lookup table includes tags and destination addresses indicating a user and a next destination of a received packet by using a tag attached to the received packet as a search key. The tag replacement and transmission part replaces a tag of the received packet with a tag detected from the lookup table and transmits the resulting packet to a destination address detected from the lookup table.

4 Claims, 9 Drawing Sheets

| | | SEARCH KEY | SEARCH RESULT | | | |
|---|---|---|---|---|---|---|
| | | VLANtag (32bit) | VLANtag (32bit) | MAC ADDRESS (48bit) | PHYSI-CAL PORT | |
| ENTRY OF USER A (VIRTUAL LINK INFOR-MATION) | a1 LINE | VLANin_a | UP VLAN1_a | M1 | P1 | UP-DIRECTIONAL ROUTING PATH |
| | a2 | UP VLAN1_a | UP VLAN2_a | M2 | P2 | |
| | a3 | UP VLAN2_a | UP VLAN3_a | M3 | P3 | |
| | a4 | ... | ... | ... | ... | |
| | a5 | UP VLANn_a | VLANout_a | Mout | Pout | |
| | a6 | VLANout_a | DOWN VLANn_a | Mn | Pn | DOWN-DIRECTIONAL ROUTING PATH |
| | a7 | ... | ... | ... | ... | |
| | a8 | DOWN VLAN1_a | VLANin_a | Min | Pin | |
| ENTRY OF USER B (VIRTUAL LINK INFOR-MATION) | b1 | VLANin_b | UP VLAN2_b | M2 | P2 | UP-DIRECTIONAL ROUTING PATH |
| | b2 | UP VLAN2_b | UP VLAN3_b | M3 | P3 | |
| | b3 | ... | ... | ... | ... | |
| | b4 | UP VLANn_b | VLANout_b | Mout | Pout | |
| | | VLANout_b | DOWN VLANn_b | Mn | Pn | DOWN-DIRECTIONAL ROUTING PATH |
| | | ... | ... | ... | ... | |
| | | DOWN VLAN2_b | VLANin_b | Min | Pin | |
| | | ... | ... | ... | ... | |
| | | ... | ... | ... | ... | |
| ENTRY OF USER X (VIRTUAL LINK INFOR-MATION) | c1 | VLANin_x | UP VLAN2_x | M2 | P2 | UP-DIRECTIONAL ROUTING PATH |
| | c2 | UP VLAN2_x | UP VLAN3_x | M3 | P3 | |
| | c3 | ... | ... | ... | ... | |
| | c4 | UP VLANn_x | VLANout_x | Mout | Pout | |
| | | VLANout_x | DOWN VLANn_x | Mn | Pn | DOWN-DIRECTIONAL ROUTING PATH |
| | | ... | ... | ... | ... | |
| | | DOWN VLAN2_x | VLANin_x | Min | Pin | |

VLAN tag

| 31 | 15 11 | 0 |
|---|---|---|
| 0×8100 | | VID |

| SEARCH KEY | SEARCH RESULT | | |
|---|---|---|---|
| VLANtag (32bit) | VLANtag (32bit) | MAC ADDRESS (48bit) | PHYSICAL PORT |
| VLANin_a | UP VLAN1_a | M1 | P1 |
| UP VLAN1_a | UP VLAN2_a | M2 | P2 |
| UP VLAN2_a | UP VLAN3_a | M3 | P3 |
| ... | ... | ... | ... |
| UP VLANn_a | VLANout_a | Mout | Pout |
| VLANout_a | DOWN VLANn_a | Mn | Pn |
| ... | ... | ... | ... |
| DOWN VLAN1_a | VLANin_a | Min | Pin |
| VLANin_b | UP VLAN1_b | M1 | P1 |
| UP VLAN1_b | UP VLAN2_b | M2 | P2 |
| UP VLAN2_b | UP VLAN3_b | M3 | P3 |
| ... | ... | ... | ... |
| UP VLANn_b | VLANout_b | Mout | Pout |
| VLANout_b | DOWN VLANn_b | Mn | Pn |
| ... | ... | ... | ... |
| DOWN VLAN2_b | VLANin_b | Min | Pin |
| ... | ... | ... | ... |
| ... | ... | ... | ... |
| VLANin_x | UP VLAN3_x | M3 | P3 |
| UP VLAN3_x | UP VLAN4_x | M4 | P4 |
| ... | ... | ... | ... |
| UP VLANn_x | VLANout_x | Mout | Pout |
| VLANout_x | DOWN VLANn_x | Mn | Pn |
| ... | ... | ... | ... |
| DOWN VLAN2_x | VLANin_x | Min | Pin | b0 LINE, b1, b2, b3, b4 (rows in b section); c2, c3 (rows in c section)

CONNECTION MANAGEMENT APPARATUS FOR NETWORK DEVICES

CROSS-REFERENCE TO RELATED APPLICATIONS

The present application is based on Japanese priority application No. 2003-068632 filed Mar. 13, 2003, the entire contents of which are hereby incorporated by reference.

BACKGROUND OF THE INVENTION

1. Field of the Invention

The present invention generally relates to a connection management apparatus for network devices, and more particularly to a connection management apparatus that can integrally accommodate configuration in which connection paths of network devices differ for individual users.

2. Description of the Related Art

Figure 1:
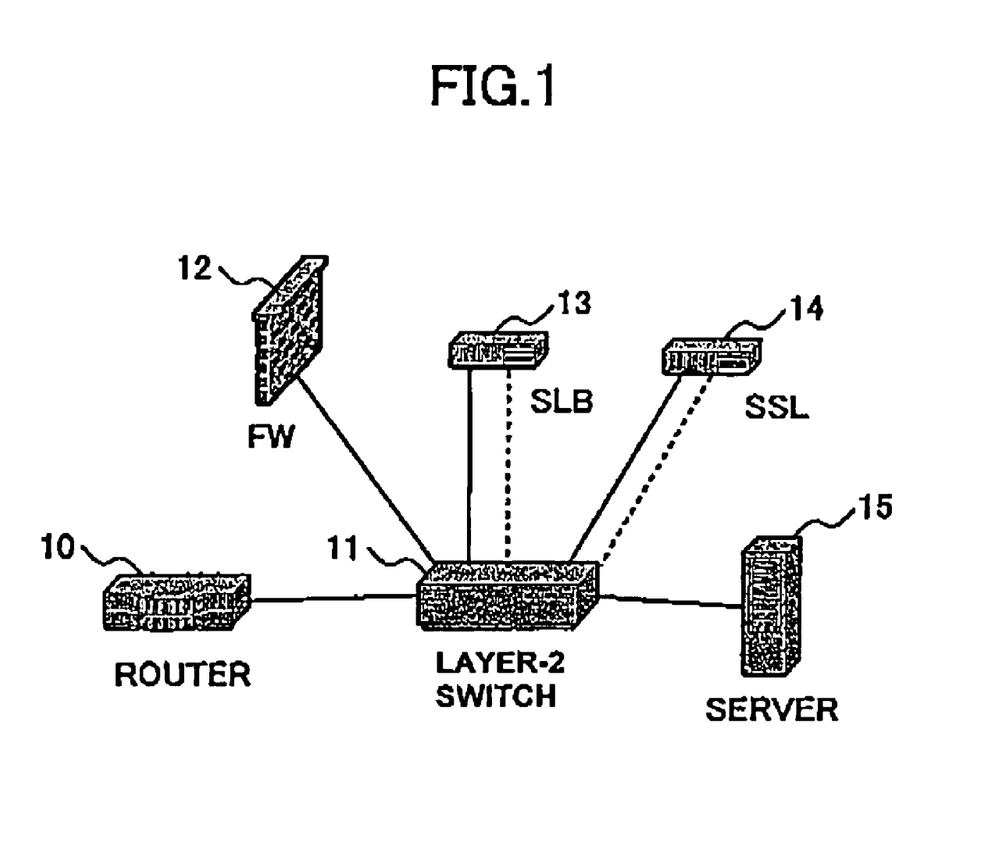
FIG. 1 is a block diagram illustrating a typical structure of a conventional connection management apparatus for network devices.

FIG. 1 is a block diagram illustrating a typical structure of a conventional connection management apparatus for network devices. As shown in FIG. 1, one or more users are connected to a router 10 via an IP (Internet Protocol) network. The router 10 is connected to a layer-2 switch 11. The layer-2 switch 11, in turn, is connected to a server 15 and various network devices such as a firewall (FW) 12, a SLB (Server Load Balancing) device 13 and a SSL (Secure Sockets Layer) device 14.

Conventional connection management apparatuses for network devices allow for different connection paths of the network devices for individual users. However, when the connection path of a user is changed, it is necessary to physically rearrange network cables corresponding to the change.

Japanese Laid-Open Patent Application No. 2002-111712 discloses a communication apparatus that can implement a transferring process between VLANs (Virtual Local Area Networks), a multi-protocol transferring process, especially, a connection process between separate networks and an editing process on packet headers in a hardware fashion.

In recent years, there have been an increasing number of services to build networks corresponding to individual users, for example, Internet Data. Center (iDC) as appreciated by those skilled in the art, and rent not only installation areas and power supplies of network devices but also the network devices themselves. When a user starts to utilize such an iDC service, the iDC needs to physically connect or arrange rented network devices in accordance with connection paths that the user desires.

In this case, under circumstances where users quite frequently go in and come from an iDC service, it is necessary to physically rearrange connection paths in response to frequent incoming and outgoing behavior, thereby increasing operational costs such as a labor cost and the number of operational steps. In addition, in a case where similar type network devices are used but connection paths are different for individual users, whenever a user having a connection path different from already registered users is joined, it is necessary to newly add another physically different network structure, thereby resulting in additional problems such as increases in installation areas.

In order to prevent physical changes of connection paths, there is an approach o logically set connection paths. In this approach, however, in order to change a connection path of a user, it is necessary to change current configurations of network devices that are located in the connection path. For example, if connections among the, network devices shown in FIG. 1 are set in accordance with VLAN, it is necessary to change IP addresses of devices that are set to be connected next to the router 10, the layer-2 switch 11, the firewall 12, the SLB device 13 and the SSL device 14. Thus, this configuration change is troublesome task.

SUMMARY OF THE INVENTION

It is a general object of the present invention to provide a connection management apparatus for network devices in which one or more the above-mentioned problems are eliminated.

A more specific object of the present invention is to provide a connection management apparatus for network devices that can easily change connection paths of the network devices for individual users, thereby decreasing the number of steps required to add and change a connection path.

In order to achieve the above-mentioned objects, there is provided according to one aspect of the present invention a connection management apparatus for connecting a plurality of physically connectable network devices based on connection paths set for individual users, including: a client port connectable to the users via a network; a server port connectable to a server; a lookup table including one or more pairs of tags and destination addresses, each of said pairs indicating a user and a next destination of a received packet by using a tag attached to the received packet as a search key wherein the attached tag indicates a user and a destination; and a tag replacement and transmission part replacing a tag of the received packet with a tag detected from the lookup table and transmitting the resulting packet to a destination address detected from the lookup table; wherein a packet received from one of the users and the server is transmitted to one of the plurality of network devices and a packet received from one of the plurality of network devices is transmitted to one of the plurality of network devices, the server and the users.

According to one aspect of the present invention, it is possible to easily change connection paths of network devices for individual users, thereby decreasing the number of steps required to add and change a connection path.

In an embodiment of the present invention, the plurality of network devices may be connected in a star topology.

According to one aspect of the present invention, it is possible to change connection paths of network devices by using a lookup table in accordance with necessity.

In an embodiment of the present invention, in the lookup table search keys may be grouped for each of the users.

According to one aspect of the present invention, it is possible to easily change connection paths of network devices for individual users.

In an embodiment of the present invention, in the lookup table the search keys may further be grouped for each of an up-directional connection path of a packet transmitted from a client side to a server side and a down-directional connection path of a packet transmitted from the server side to the client side.

According to one aspect of the present invention, it is possible to easily change connection paths of network devices for each of an up-directional connection path and a down-directional connection path.

In an embodiment of the present invention, the lookup table may further include one or more physical ports corresponding to search keys together with the pairs of tags and destination addresses each of which indicates a user and a next destination.

According to one aspect of the present invention, it is possible to obtain information on physical ports via which a packet is transmitted.

In an embodiment of the present invention, the lookup table may be rewritable through a terminal.

In an embodiment of the present invention, the tag may be a VLAN tag.

Other objects, features and advantages of the present invention will become more apparent from the following detailed description when read in conjunction with the accompanying drawings.

DETAILED DESCRIPTION OF THE PREFERRED EMBODIMENTS

In the following, embodiments of the present invention will be described with reference to the accompanying drawings.

Figure 2:
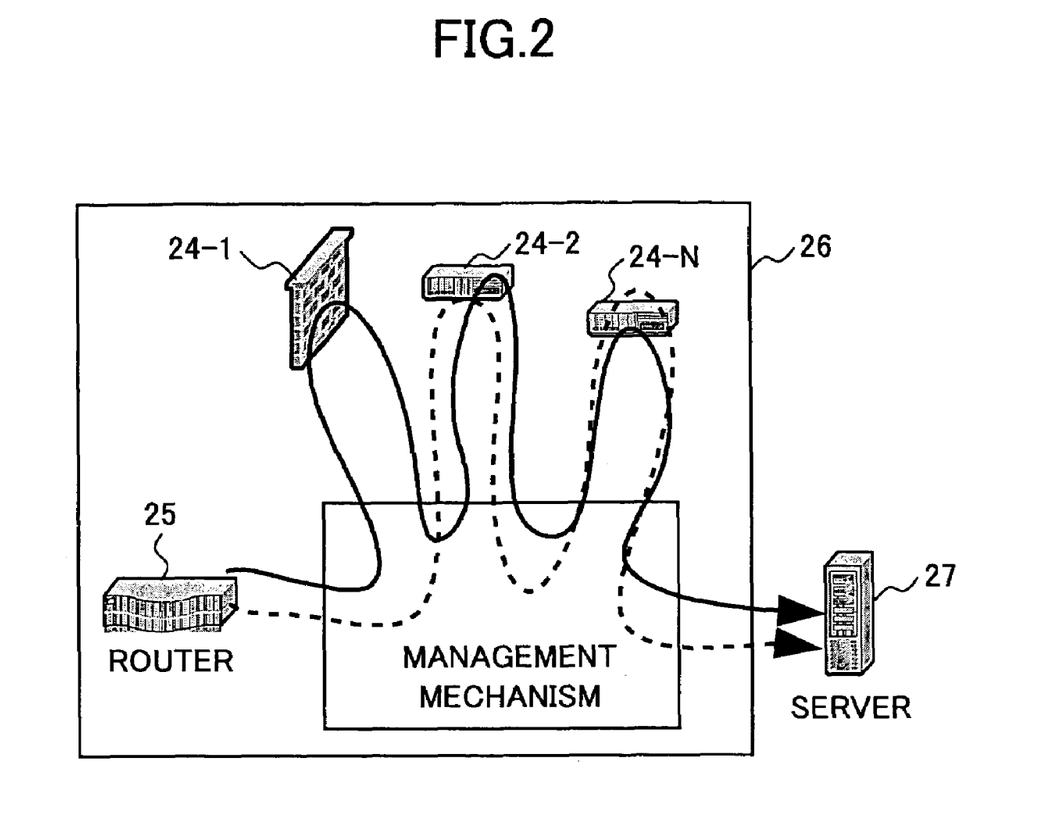
FIG. 2 is a schematic view of a connection management apparatus for network devices according to one embodiment of the present invention.
Figure 3:
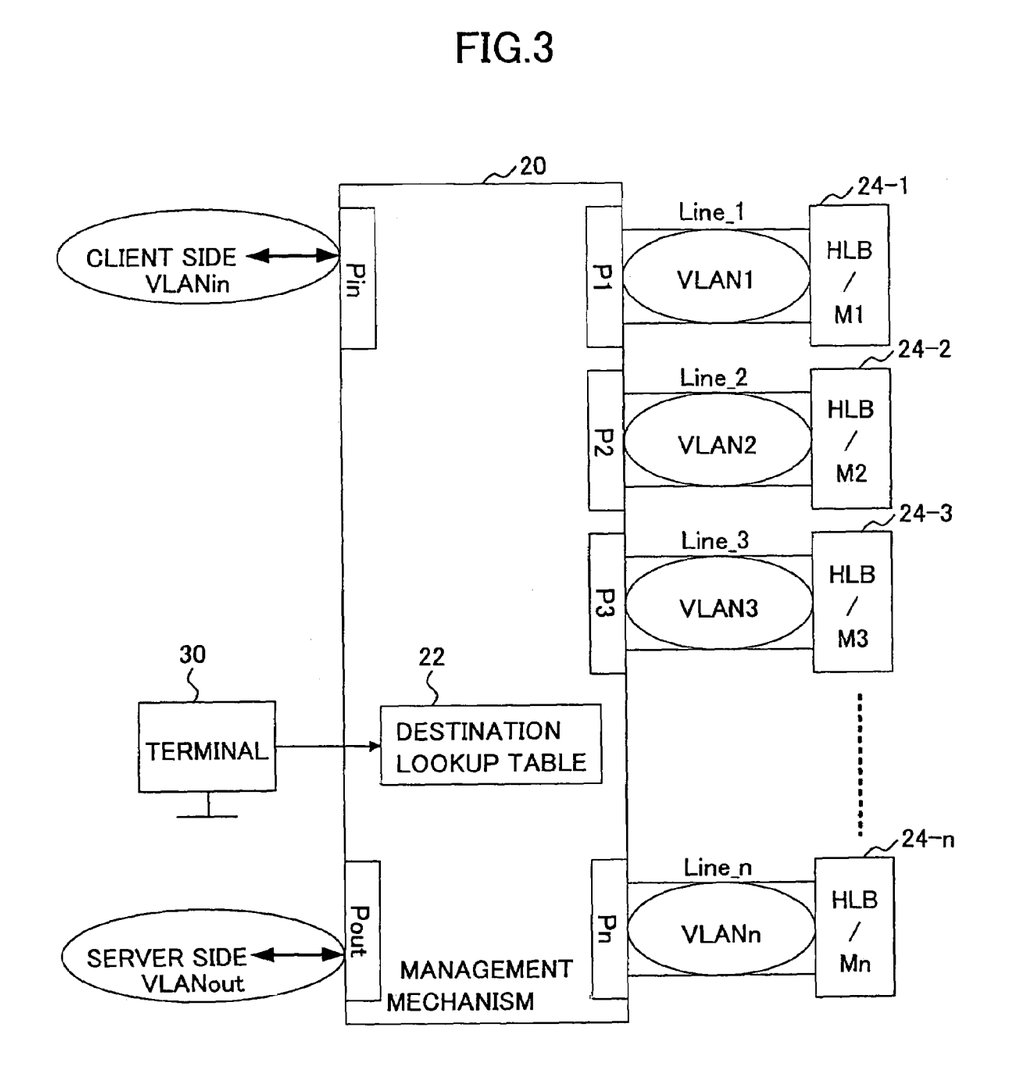
FIG. 3 is a block diagram of an exemplary structure of a connection management apparatus for network devices according to one embodiment of the present invention.

FIG. 2 is a schematic view of a connection management apparatus for network devices according to one embodiment of the present invention. FIG. 3 is a block diagram of an exemplary structure of a connection management apparatus for network devices according to one embodiment of the present invention.

Referring to FIG. 3, a management mechanism 20 uses a destination lookup table 22 to manage connection paths for individual users. The management mechanism 20 also has a conventional layer-2 switch function. As shown in FIG. 3, the management mechanism 20 includes physical ports Pin, Pout, and P1 through Pn. The physical port Pin is connected to a router in the client side, that is, a router that is connected to an IP network. The physical port Pout is connected to a server. The physical ports P1 through Pn are connected to processing blocks (HLB) 24-1 through 24-n, respectively.

Referring to FIG. 2, the management mechanism 20 and the processing blocks 24-1 through 24-n together with the router 25 are accommodated within a housing 26. In one embodiment of the present invention, a tag VLAN (Virtual Local Area Network) is used to manage connections between a connection management apparatus and individual processing blocks. In addition, the VLAN tag is used to identify flow of a packet supplied from the client side for each pair of a user and a destination. Accordingly, for example, a packet from user A is supplied to the server 27 via the processing blocks 24-1, 24-2, ..., 24-n, as illustrated by the solid arrow in FIG. 2. Also, a packet from user B is supplied to the server B via the processing blocks 24-2, ..., 24-n, as illustrated by the dashed arrow in FIG. 2.

The individual processing blocks 24-1 through 24-n shown in FIG. 3 operate in accordance with an operation policy of each user. For example, some of the processing blocks 24-1 through 24-n may work as firewalls, SLB devices and SSL devices.

In FIG. 3, the notation "Line_1" through "Line_n" represent physical connection lines. The notations "VLANin", "VLANout" and "VLAN1" through "VLANn" represent VLAN tags of the respective blocks. The notation "M0" through "Mn" represent respective MAC (Media Access Control) addresses for the connection management apparatus and the processing blocks 24-1 through, 24-n, respectively. In this embodiment, the management mechanism 20 has a star topological connection configuration in order to collectively manage connection paths.

As mentioned above, the management mechanism 20 includes the destination lookup table 22. The management mechanism 20 searches the destination lookup table 22 by using VLAN tags attached to input packets as search keys. In this embodiment, the destination lookup table 22 is configured to be rewritable in accordance with instruction from a terminal 30.

Figure 4:
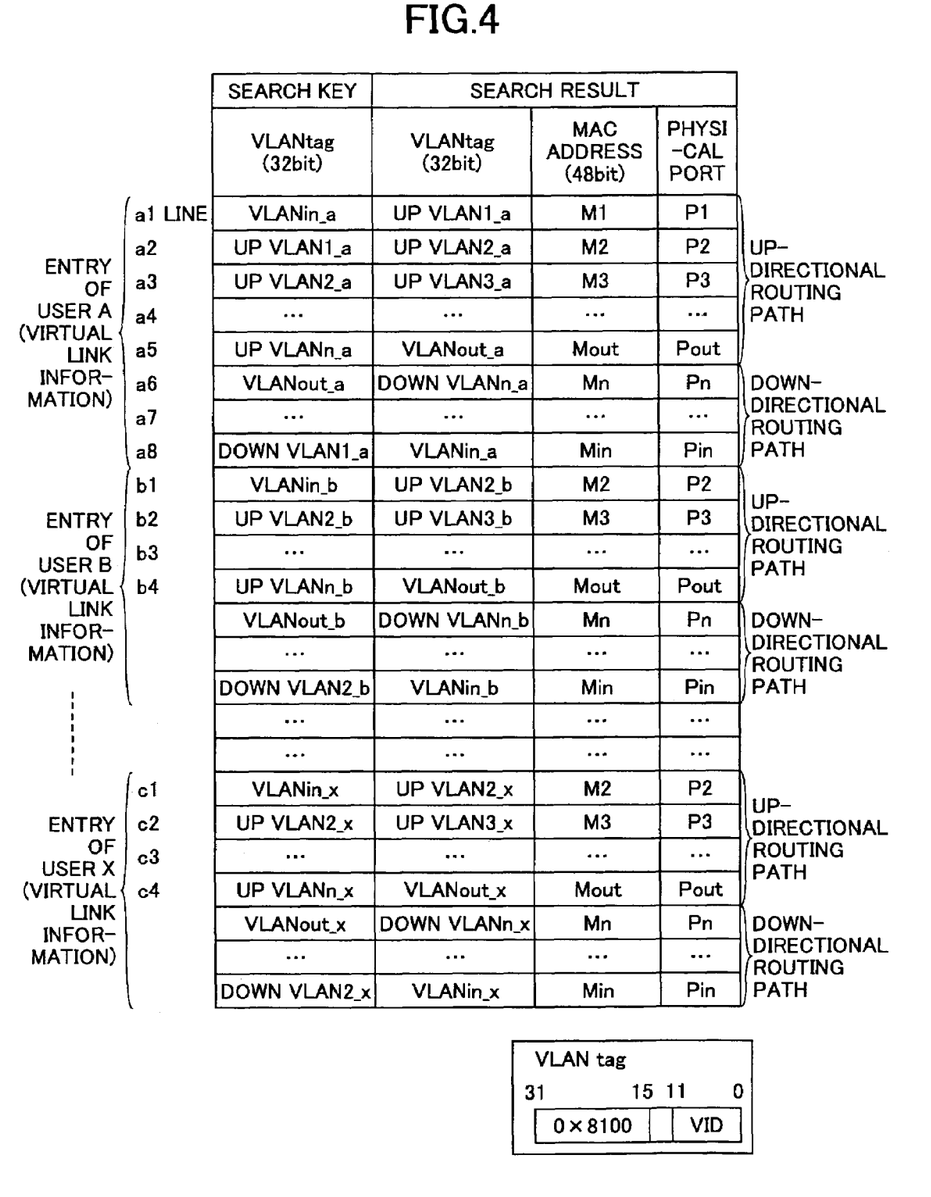
FIG. 4 is a diagram illustrating an exemplary arrangement of a destination lookup table of a management mechanism according to one embodiment of the present invention.

FIG. 4 shows an exemplary arrangement of the destination lookup table 22 of the management mechanism 20 according to one embodiment of the present invention.

Referring to FIG. 4, by using search keys (VLAN tags of 32 bits) as entries, destination VLAN tags of 32 bits, destination MAC addresses of 48 bits and physical ports are registered in the destination lookup table 22. In this embodiment, destination VLAN tags detected from the destination lookup table 22 are used as the search keys at the next step. Thus, it is possible to maintain processing block link information in which an up-directional connection path and a down-directional connection path are successively described. Here, it is noted that the up-directional connection path means the connection path of a packet transmitted from the client side to the server side. On the other, the down-directional connection path means the connection path of a packet transmitted from the server side to the client side.

In this embodiment, the search keys for the destination lookup table 22 are grouped for each user, and the grouped search keys are further divided into up-directional search keys and down-directional search keys. Accordingly, it is possible to maintain pieces of processing block link information separately from not only each user but also the up-directional connection path and the down-directional-connection path.

In this embodiment, the upper 16 bits of a VLAN tag of 32 bits are set as "0x8100" and the lower 16 bits are used for a user identifier VID, as illustrated in the bottom area of FIG. 4. It is noted that the symbol "0x" represents a hexadecimal number.

Figure 5:
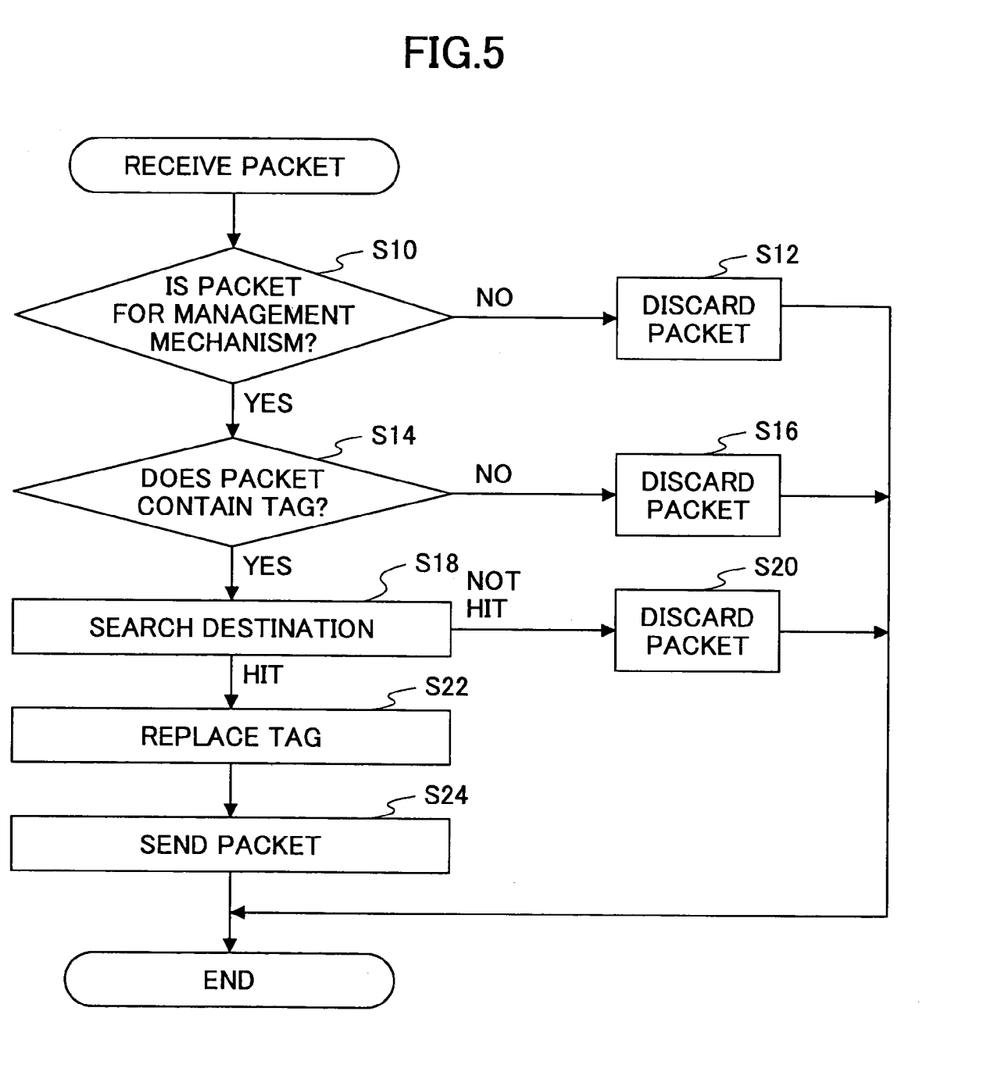
FIG. 5 is a flowchart of an exemplary connection operation performed by the management mechanism according to one embodiment of the present invention.

FIG. 5 is a flowchart of an exemplary connection operation performed by the management mechanism 20 according to one embodiment of the present invention.

Referring to FIG. 5, in response to receipt of a packet, the management mechanism 20 determines whether or not the destination of the received packet coincides with the MAC address thereof at step S10. If the received packet is not for the MAC address of the management mechanism 20 (S10: NO), the management mechanism 20 discards the packet at step S12 and then terminates the connection operation. On the other hand, if the received packet is for the MAC address of the management mechanism 20 (S10: YES), the control flow proceeds to step S14.

At step S14, the management mechanism 20 determines whether the received packet contains a VLAN tag. If the packet contains no VLAN tag (S14: NO), the management mechanism 20 discards the packet at step S16 and then terminates the connection operation. On the other hand, if the packet contains a VLAN tag (S14: YES), the control flow proceeds to step S18.

At step S18, the management mechanism 20 uses the detected VLAN tag as a search key to search the destination lookup table 22. If the corresponding VLAN tag is not detected in the destination lookup table 22 (S18: NOT HIT), the management mechanism 20 discards the packet at step S20 and then terminates the connection operation. On the other hand, if the corresponding VLAN tag is detected in the destination lookup table 22 (S18: HIT), the control flow proceeds to step S22.

At step S22, the management mechanism 20 replaces the VLAN tag and the MAC address of the received packet with the VLAN tag and the MAC address detected from the destination lookup table 22, respectively. At step S24, the management mechanism 20 sends the resulting packet to an appropriate processing block via the physical port detected from the destination lookup table 22.

Figure 6:
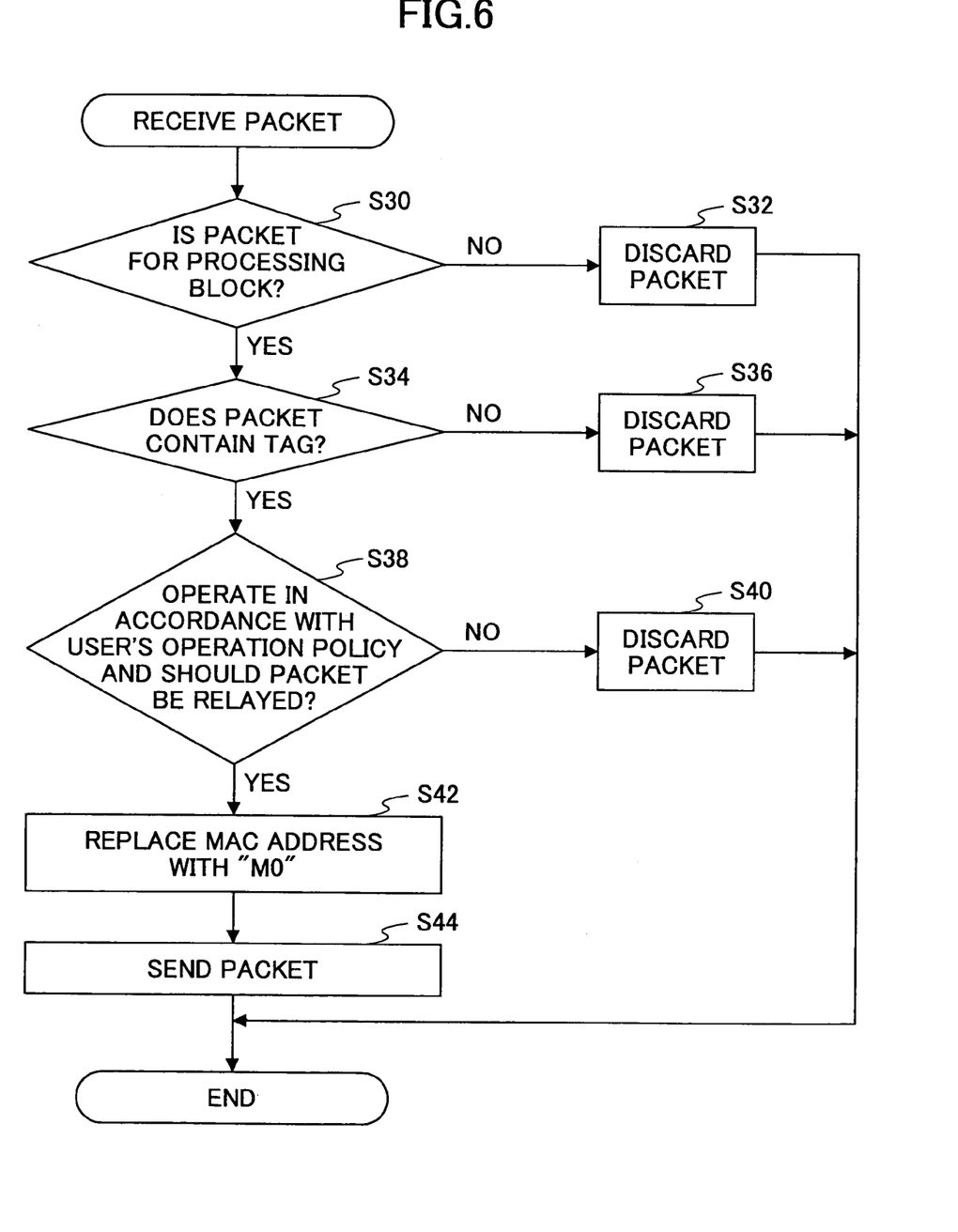
FIG. 6 is a flowchart of an exemplary connection operation performed by a processing block according to one embodiment of the present invention.

FIG. 6 is a flowchart of an exemplary connection operation performed by each of the processing blocks 24-1 through 24-n according to one embodiment of the present invention.

Referring to FIG. 6, in response to receipt of a packet, the processing block determines whether or not the destination of the received packet coincides with the MAC address thereof. If the received packet is not for the MAC address of the processing block (S30: NO), the processing block discards the packet at step S32 and then terminates the connection operation. On the other hand, if the received packet is for the MAC address of the processing block (S30: YES), the control flow proceeds to step S34.

At step S34, the processing block determines whether or not the received packet contains a VLAN tag. If the packet contains no VLAN tag (S34: NO), the processing block discards the packet at step S36 and then terminates the connection operation. On the other hand, if the received packet contains a VLAN tag (S34: YES), the control flow proceeds to step S38.

At step S38, the processing block operates in accordance with the operation policy of the user such as a firewall process, a server load balancing process, an encryption/decryption process. Based on a result of such a process, if the processing block determines that the packet should not be relayed to another device any more (S38: NO), the processing block discards the packet at step S40 and then terminates the connection operation. On the other hand, if the processing block determines to further relay the packet to another device (S38: YES), the control flow proceeds to step S42.

At step S42, the processing block replaces the MAC address of the received packet with the MAC address "M0" of the management mechanism. 20. At step S44, the processing block sends the resulting packet to the management mechanism 20.

Figure 7:
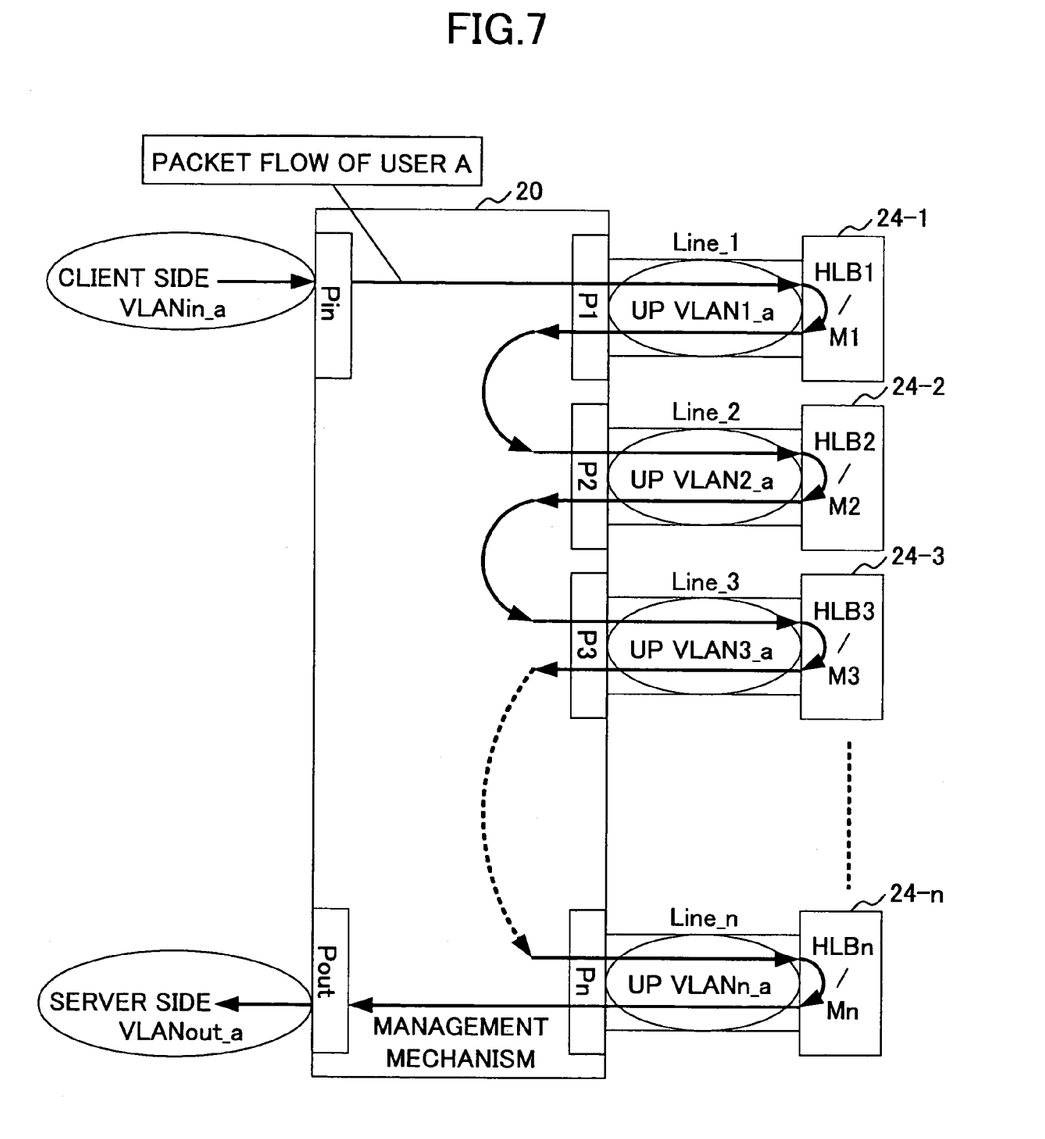
FIG. 7 is a diagram illustrating exemplary flow of an up-directional packet according to one embodiment of the present invention.

FIG. 7 shows exemplary flow of an up-directional packet according to one embodiment of the present invention.

Referring to FIG. 7, a packet supplied from user A to the management mechanism 20 contains the VLAN tag "VLANin_a". In accordance with the above-mentioned connection operation, the management mechanism 20 replaces the VLAN tag and the MAC address of the received packet with the VLAN tag "VLAN1_a" and the MAC address "M1", respectively, with reference to the a1 line of the destination lookup table in FIG. 4, and then sends the resulting packet to the processing block 24-1. In response to receipt of the packet from the management mechanism 20, the processing block 24-1 operates in accordance with the operation policy of user A. Then, the processing block 24-1 changes the MAC address of the received packet into "M0" of the management mechanism 20, and sends the resulting packet to the management mechanism 20.

In response to receipt of the packet from the processing block 24-1, the management mechanism 20 replaces the VLAN tag and the MAC address of the received packet with the VLAN tag "VLAN2_a" and the MAC address "M2", respectively, and then sends the resulting packet to the processing block 24-2. Similarly to the processing block 24-1, the processing block 24-2 operates in accordance with the operation policy of user A. Then, the processing block 24-2 changes the MAC address of the received packet into "M0" of the management mechanism 20, and sends the resulting packet to the management mechanism 20. Similarly, the processing blocks 24-3 through 24-n sequentially perform some predetermined processes on the packet supplied from user A in course of the connection path described in the destination lookup table 22. Finally, the management mechanism 20 replaces the VLAN tag and the MAC address of the packet received from the processing block 24-n with the VLAN tag "VLANout_a" detected from the a5 line of the destination lookup table 22 and the MAC address "Mout" of the server, respectively, and then sends the resulting packet to the server side.

Figure 8:
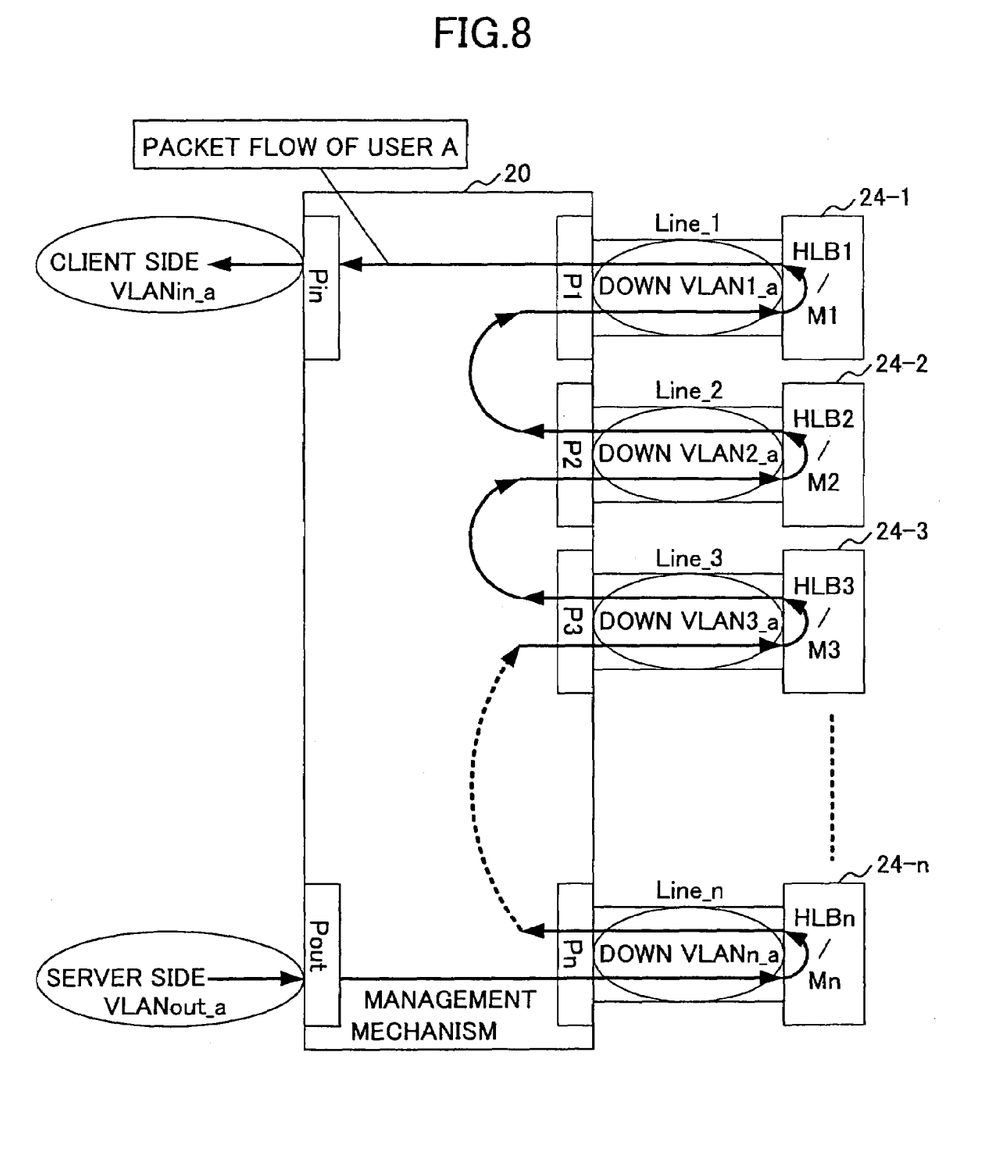
FIG. 8 is a diagram illustrating exemplary flow of an down-directional packet according to one embodiment of the present invention.

FIG. 8 shows exemplary flow of an down-directional packet according to one embodiment of the present invention.

Referring to FIG. 8, a packet supplied from the server to the management mechanism 20 contains the VLAN tag "VLANout_a". In response to receipt of the packet, the management mechanism, 20 replaces the VLAN tag and the MAC address of the received packet with the VLAN tag "VLANn_a" and the MAC address "Mn" of the processing block 24-n, respectively, with reference to the a6 line of the destination lookup table 22 in FIG. 4, and then sends the resulting packet to the processing block 24-n. As mentioned above, the processing block 24-n operates in accordance with the operation policy of user A. Then, the processing block 24-n replaces the MAC address of the received packet into "M0", of the management mechanism 20, and sends the resulting packet to the management mechanism 20.

Similarly to the up-directional connection operation, the remaining processing blocks 24-(n-1) through 24-1 performs some predetermined processes on the packet to be transmitted toward user A in course of the connection path described in the destination lookup table 22. Finally, the management mechanism 20 changes the VLAN tag and the MAC address of the packet received from the processing block 24-1 into "VLANin_a" detected from the a8 line of the destination lookup table 22 and the MAC address "Min" of user A, respectively, and sends the resulting packet to the client side.

In addition, the up-directional connection path for a packet supplied from user B is prescribed in the b1 through b4 lines of the destination lookup table 22 in FIG. 4. It can be seen from the destination lookup table 22 that the packet supplied from user B is processed through the processing blocks 24-2, 24-3, . . . , 24-n sequentially.

Figure 9:
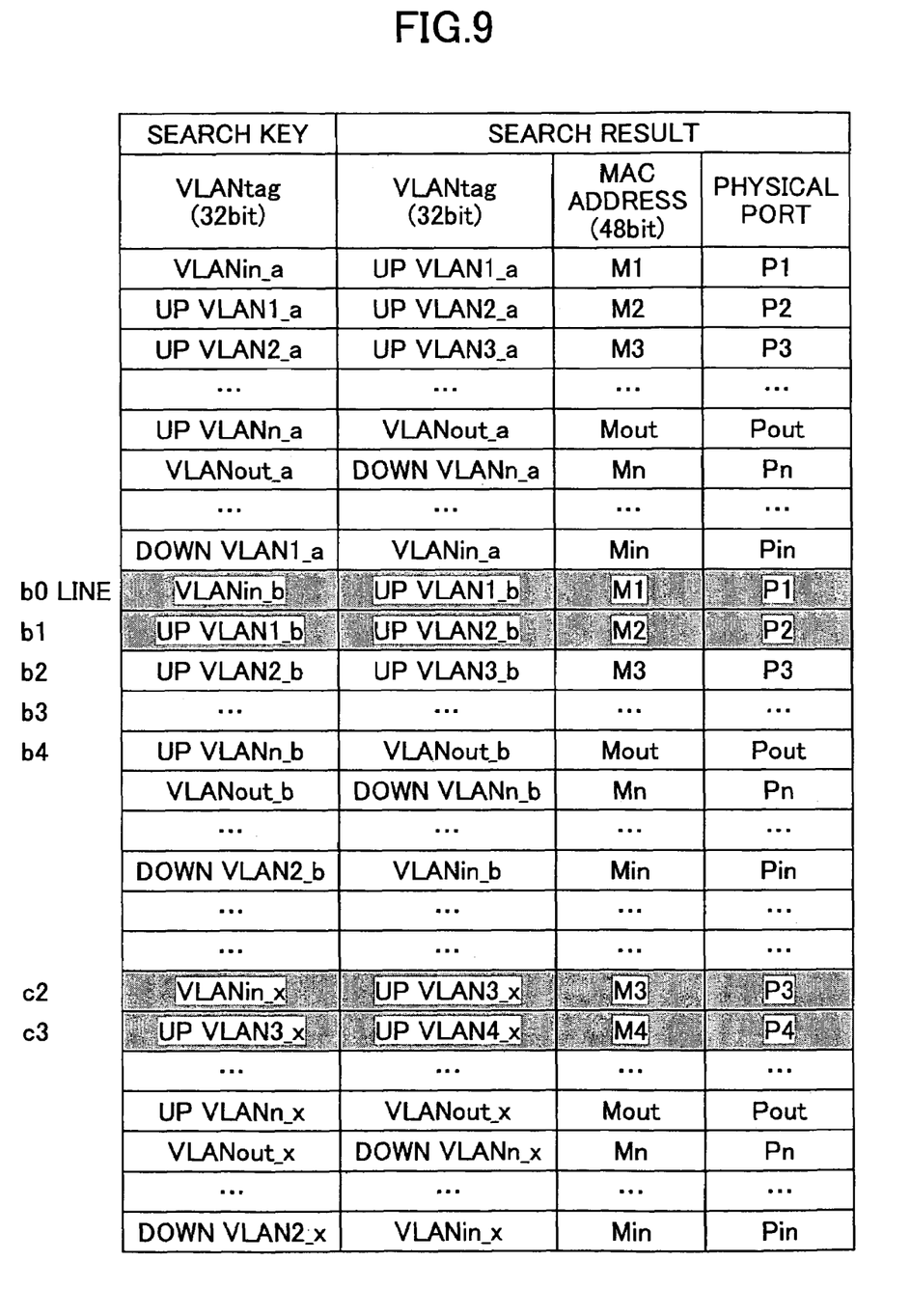
FIG. 9 is a diagram for explaining an exemplary change operation of the destination lookup table according to one embodiment of the present invention.

Here, in order to add the processing block 24-1 to the head of the up-directional connection path for user B; the b1 line of the destination lookup table 22 in FIG. 4 is changed into the b0 and b1 lines of the destination lookup table 22 in FIG. 9. This change instruction is supplied from the terminal 30.

FIG. 9 is a diagram for explaining an exemplary change operation of the destination lookup table 22 according to one embodiment of the present invention.

Referring to FIG. 9, the b0 line indicates the VLAN tag "VLAN1_b" and the MAC address "M1" corresponding to the search key "VLANin_b". Namely, the b0 line indicates that a packet supplied from user B should be first sent to the processing block 24-1. Also, the b1 line indicates the VLAN tag "VLAN2_b" and the MAC address "M2" corresponding to the search key "VLAN1_b". Namely, the b1 line indicates that the packet should be then sent to the processing block 24-2.

Furthermore, the up-directional connection path for a packet supplied from user X is prescribed in the c1, c2, . . . lines of the destination lookup table 22 in FIG. 4. It can be seen from the destination lookup table 22 that the packet supplied from user X is processed through the processing blocks 24-2, 24-3, . . . sequentially.

Here, in order to remove the processing block 24-2 from the up-directional connection path for user X, the c1 line of the destination lookup table 22 is removed as illustrated in FIG. 9 and the search key of the c2 line is changed into "VLANin_x". This change instruction is supplied from the terminal 30.

According to the above-mentioned change instruction, it is possible to easily change connection paths of processing blocks for individual users by partially changing the destination lookup table 22 of the management mechanism 20. As a result, even in a case where similar type network devices are used while different connection paths are set for individual users, it becomes unnecessary to change connection paths for a plurality of network devices by collecting pieces of information on the connection paths in the destination lookup table 22 and collectively managing a plurality of users. Thus, it is possible to save an occupied installation area and decrease operational costs incurred by changing connection paths.

Here, it is noted that above-mentioned step S22 corresponds to a tag replacement and transmission part in the attached claims.

The present invention is not limited to the specifically disclosed embodiments, and variations and modifications may be made without departing from the scope of the present invention.

What is claimed is:

1. A connection management apparatus for connecting a plurality of physically connectable network devices based on connection paths set for individual users, comprising:
   a client port connectable to the users via a network;
   a server port connectable to a server;
   a lookup table including one or more linked pairs of tags and destination addresses, each of said linked pairs indicating a user and a next destination of a received packet by using a tag attached to the received packet as a search key wherein said attached tag indicates a user and a destination; and
   a tag replacement and transmission part replacing a tag of the received packet with a tag detected from the lookup table and transmitting the resulting packet to a destination address detected from the lookup table;
   wherein a packet received from one of the users and the server is transmitted to one of the plurality of network devices and a packet received from one of the plurality of network devices is transmitted to one of the plurality of network devices, the server and the users, and a sequence of the linked pairs of tags and destination addresses is configured to specify an up-directional connection path of the packet from a client side to a server side or a down-directional connection path of the packet from the server side to the client side,
   the plurality of network devices are connected in a star topology,
   in the lookup table, search keys are grouped for each of the users, and
   in the lookup table, the search keys are further grouped for each of the up-directional connection path and the down-directional connection path.

2. The connection management apparatus as claimed in claim 1, wherein the lookup table further includes one or more physical ports corresponding to search keys together with the pairs of tags and destination addresses each of which indicates a user and a next destination.

3. The connection management apparatus as claimed in claim 1, wherein the lookup table is rewritable through a terminal.

4. The connection management apparatus as claimed in claim 1, wherein the tag is a VLAN tag.

* * * * *